Patented Aug. 19, 1952

2,607,773

UNITED STATES PATENT OFFICE 2,607,773

PROCESSES FOR PREPARING PHENTHIAZINE DERIVATIVES

Samuel Sidney Berg and Julius Nicholson Ashley, Dagenham, England, assignors to Societe des Usines Chimiques Rhone-Poulenc, Paris, France, a French body corporate No Drawing. Application September 29, 1950, Serial No. 187,671. In Great Britain October 6, 1949

13 Claims. (Cl. 260—243)

The present invention is for improvements in or relating to the production of phenthiazine derivatives and is particularly concerned with a new method of producing phenthiazines which are substituted on the ring nitrogen atom by a dialkylaminoalkyl group.

It is known to prepare these N-alkylaminoalkyl compounds by the action on phenthiazine, or a phenthiazine containing an alkyl or alkoxy substitutent, of a dialkylamino-alkyl halide in the presence of sodamide or like condensing agent.

According to the present invention, it has now been found that these phenthiazine derivatives can be prepared using, as starting material, the complex formed by reacting a member of the class consisting of phenthiazine and substituted phenthiazines with a Grignard reagent. This complex is, according to the present invention, reacted with the appropriate dialkylamino-alkyl halide.

While the process of the present invention is broadly applicable to the production of any N-dialkylaminoalkyl-phenthiazine, it is particularly useful for the manufacture of therapeutically important phenthiazine derivatives containing, as substituent in the 10-position, a member of the class consisting of straight and branched chains having the formula $(CR_1R_2)_n$—N—$(R_3)_2$ (where $R_1$ and $R_2$ are the same or are different and represent a member of the class consisting of hydrogen and methyl, $R_3$ represents a member of the class consisting of methyl and ethyl and $n$ is not less than 2 and not greater than 3 such that the grouping $(CR_1R_2)_n$, in which the successive $CR_1R_2$ groups may be the same or different, contains not more than three carbon atoms) and in which the phenthiazine ring may be substituted by a methoxy group in the 3-position, i. e. meta to the sulphur atom.

The Grignard reagent may be of alkyl, aryl or aralkyl type, the specific nature of which is unimportant provided that it will undergo reaction with the phenthiazine starting material to form a complex of the type P. Mg. X. where P represents the phenthiazine nucleus and X represents a halogen atom. The conditions of reaction are, in general, those usually employed for Grignard reactions. Thus the reagents may be heated in an inert anhydrous solvent medium such, for example, as a hydrocarbon e. g. benzene.

Where the phenthiazine side chain is branched, the dialkylaminoalkyl halide may be derived from an isomer of the substituted alkane corresponding to the said chain. For example, it has been found that, where the said chain is 2'-dimethylamino-2'-methylethyl- or 2'-diethylamino-2'-methylethyl-, the dialkylaminoalkyl halide may be either an $\alpha$-methyl-$\beta$-dimethylamino haloethane or $\beta$-methyl-$\beta$-dimethylamino haloethane in the first case, or an $\alpha$-methyl-$\beta$-diethylamino haloethane or $\beta$-methyl-$\beta$-diethylamino haloethane in the second case. Whether the methyl substituent is on the carbon in positions $\alpha$- or $\beta$- in relation to the halogen, isomerisation is effected during the course of the reaction with the simultaneous production of two isomeric products. These two isomers may be separated by conversion of the bases into hydrochlorides, fractional crystallisation of the hydrochlorides, and liberation of the bases by the action of a caustic alkali.

The process of the present invention is especially applicable to the production of the therapeutically important compounds N-diethylaminoethyl-phenthiazine, N-(2'-dimethylamino 2'-methylethyl)-phenthiazine and N-(2'-diethylamino-2'-methylethyl)-phenthiazine as illustrated in the following examples.

Example I

A solution of 6.2 g. of phenthiazine in 100 c. c. of warm dry benzene was added slowly with vigorous stirring in an atmosphere of hydrogen to a Grignard reagent prepared from 1 g. of magnesium, 20 c. c. of dry ether and 6.2 g. of methyl iodide. The green-coloured mixture was refluxed for 30 minutes and then 5.9 g. of $\beta$-diethylaminoethyl chloride in 10 c. c. of dry benzene was added gradually in three portions during 1 hour. After boiling for 1.5 hours, the mixture was cooled to 10° C. and treated with aqueous ammonium chloride. The benzene layer was extracted with 10% aqueous hydrochloric acid, the acidic extract basified at 5° C., with 50% aqueous sodium hydroxide, and the liberated oil extracted with chloroform. After drying, and removal of solvent, the residual oil was distilled and yielded N-diethylamino-ethyl-phenthiazine, B. P. 165–170° C. (bath temperature) at 0.05 m. m. The hydrochloride had M. P. 184–186° C.

Example II 6.2 g. of phenthiazine in 100 c. c. of warm dry benzene was added during one hour with stirring, and in an atmosphere of hydrogen, to the Grignard reagent prepared from 1 g. of magnesium, 6.2 g. of methyl iodide, and 20 c. c. of dry ether. After boiling for 30 minutes, a solution of 6.2 g. of 2-chloro-1-dimethylaminopropane in 10 c. c. of dry benzene was added during one hour to the boiling solution, and heating was maintained for a further 1.5 hours. The reaction mixture was then cooled and treated with aqueous ammonium chloride, and chloroform added to dissolve an oil at the interface of the benzene and aqueous layers. The chloroform-benzene extract was extracted with 2 N hydrochloric acid and the acid extract was basified at 5–10° C. with 50% aqueous sodium hydroxide. The liberated oil, after extraction with chloroform, distilled as a viscous yellow liquid, B. P. 145–155° C. (bath temperature)/0.08 mm. When treated with acetone and hydrogen chloride it gave N-(2'-dimethyl-amino-2'-methylethyl)-phenthiazine hydrochloride, which crystallised from alcohol-ether in white prisms, M. P. 218–220° C. N-(2'-dimethylamino-1'-methylethyl) phenthiazine hydrochloride was obtained as a yellow gum from the acetone mother liquors.

Example III

Following the procedure of Example II, but using 6.6 g. of 2-chloro-1-diethylaminopropane, there was obtained a mixture of N-(2'-diethylamino-2'-methylethyl)-phenthiazine and N-(2'-diethylamino-1'-methylethyl)-phenthiazine in the form of a viscous yellow oil, B. P. 202–205° C./2 mm. This oil was treated in ethereal solution with ethereal hydrogen chloride and gave a white solid which was fractionally crystallised from ethylene dichloride. The less soluble fraction, N-(2'-diethylamino-2'-methylethyl)-phenthiazine hydrochloride formed colourless rhombs, M. P. 223–225° C. The more soluble N-(2'-diethylamino-1'-methylethyl)-phenthiazine hydrochloride was obtained as colourless prismatic needles, M. P. 166–168° C.

We claim:

1. A process for the manufacture of a 10-dialkylaminoalkyl-phenthiazine which comprises reacting a dialkylaminoalkyl halide with a complex of a Grignard reagent with a phenthiazine.

2. A process for the manufacture of a phenthiazine containing, as substituent in the 10-position, a member of the class consisting of straight and branched chains $(CR_1R_2)_n$—N—$(R_3)_2$ (where $R_1$ and $R_2$ are each selected from the class consisting of hydrogen and methyl, $R_3$ represents a member of the class consisting of methyl and ethyl and $n$ is not less than 2 and not greater than 3 such that the grouping $(CR_1R_2)_n$ contains not more than three carbon atoms) and in which the phenthiazine ring may be substituted by a methoxy group in the 3-position, wherein a member of the class consisting of unsubstituted phenthiazine and phenthiazine substituted by a methoxy group in the 3-position is treated with a Grignard reagent and the resultant complex is treated with a dialkylaminoalkyl halide corresponding to the aforesaid side chain.

3. A process for the manufacture of a phenthiazine containing, as substituent in the 10-position, a member of the class consisting of straight and branched chains $(CR_1R_2)_n$—N—$(R_3)_2$ (where $R_1$ and $R_2$ are each selected from the class consisting of hydrogen and methyl, $R_3$ represents a member of the class consisting of methyl and ethyl and $n$ is not less than 2 and not greater than 3 such that the grouping $(CR_1R_2)_n$ contains not more than three carbon atoms) and in which the phenthiazine ring may be substituted by a methoxy group in the 3-position, wherein a member of the class consisting of unsubstituted phenthiazine and phenthiazine substituted by a methoxy group in the 3-position is treated with a Grignard reagent and the resultant reaction mixture is treated with a dialkylaminoalkyl halide corresponding to the aforesaid side chain.

4. A process as claimed in claim 1 wherein the dialkylaminoalkyl halide is a halide of an isomer of the dialkylamino alkane corresponding to the end product side chain.

5. A process as claimed in claim 2 wherein the dialkylaminoalkyl halide is a halide of an isomer of the dialkylamino alkane corresponding to the end product side chain.

6. A process as claimed in claim 3 wherein the dialkylaminoalkyl halide is a halide of an isomer of the dialkylamino alkane corresponding to the end product side chain.

7. A process for producing N-diethylaminoethyl-phenthiazine which comprises reacting a β-diethylaminoethyl halide with a complex of phenthiazine with a Grignard reagent.

8. A process for producing N-(2'-dimethylamino-2'-methylethyl)-phenthiazine which comprises reacting a methyl-dimethylaminoethyl halide with the complex of phenthiazine with a Grignard reagent and separating the isomeric products obtained.

9. A process as claimed in claim 8 wherein the methyl substituent of the halide is in position α- to the halogen.

10. A process as claimed in claim 8 wherein the methyl substituent of the halide is in position β- to the halogen.

11. A process for producing N-(2'-diethylamino-2'-methylethyl)-phenthiazine which comprises reacting a methyl-diethylaminoethyl halide with the complex of phenthiazine with a Grignard reagent and separating the isomeric products obtained.

12. A process as claimed in claim 11 wherein the methyl substituent of the halide is in position α- to the halogen.

13. A process as claimed in claim 11 wherein the methyl substituent of the halide is in position β- to the halogen.

SAMUEL SIDNEY BERG.
JULIUS NICHOLSON ASHLEY.

REFERENCES CITED

The following references are of record in the file of this patent:

UNITED STATES PATENTS

| Number | Name | Date |
|---|---|---|
| 2,217,566 | Smith | Oct. 8, 1940 |
| 2,411,664 | Miescher et al. | Nov. 26, 1946 |
| 2,498,432 | Lee | Feb. 21, 1950 |

FOREIGN PATENTS

| Number | Country | Date |
|---|---|---|
| 917,595 | France | Jan. 15, 1947 |

OTHER REFERENCES

Gilman et al.: Jour. Amer. Chem. Soc., vol. 66 (1944), pp. 888–892